(12) United States Patent
Bhakta (10) Patent No.: US 11,500,256 B1
(45) Date of Patent: Nov. 15, 2022

(54) SYSTEM AND METHOD FOR AN ON-DEMAND REWRITABLE, COLOR DISPLAY ON SOFT MATERIAL

(71) Applicant: Raj Bhakta, Humble, TX (US)

(72) Inventor: Raj Bhakta, Humble, TX (US)

( * ) Notice: Subject to any disclaimer, the term of this patent is extended or adjusted under 35 U.S.C. 154(b) by 0 days.

(21) Appl. No.: 17/212,959

(22) Filed: Mar. 25, 2021

(51) Int. Cl.
| | |
|---|---|
| *G02F 1/1514* | (2019.01) |
| *A41D 1/00* | (2018.01) |
| *G09G 3/38* | (2006.01) |
| *G02F 1/163* | (2006.01) |
| *G09G 3/00* | (2006.01) |

(52) U.S. Cl.
CPC .......... *G02F 1/1514* (2019.01); *A41D 1/002* (2013.01); *G02F 1/163* (2013.01); *G09G 3/38* (2013.01); *G09G 3/035* (2020.08); *G09G 2380/02* (2013.01)

(58) Field of Classification Search
CPC ...... G02F 1/1514; G02F 1/163; G02F 1/1679; A41D 1/002; G09G 3/38; G09G 3/035; G09G 2380/02; B32B 38/145; C09B 41/001; G06F 3/014; H05K 1/0283; H01L 27/1218; C09D 11/322
See application file for complete search history.

(56) References Cited

U.S. PATENT DOCUMENTS

| | | | | |
|---|---|---|---|---|
| 2009/0314527 A1* | 12/2009 | Hatano | ............... | H01L 27/1218 438/106 |
| 2010/0007942 A1* | 1/2010 | Oikawa | ................ | G02F 1/1679 359/296 |
| 2011/0277668 A1* | 11/2011 | Carlini | ................. | C09B 41/001 534/751 |
| 2012/0106095 A1* | 5/2012 | Daniel | ................ | H05K 1/0283 361/728 |
| 2015/0337145 A1* | 11/2015 | Torrisi | ................ | C09D 11/322 428/207 |
| 2019/0179412 A1* | 6/2019 | Penmatcha | ............. | G06F 3/014 |
| 2020/0019364 A1* | 1/2020 | Pond | ........................ | G06F 3/14 |
| 2021/0094270 A1* | 4/2021 | Whiton | ................ | B32B 38/145 |

* cited by examiner

*Primary Examiner* — Richard J Hong
(74) *Attorney, Agent, or Firm* — Alpine Patents LLC; Brian Van Osdol (57) ABSTRACT

System and method for a rewritable color display on soft material comprising: a textile platform; a canvas display, comprising color changing substances, polymers, and a stabilizer. The system functions as a textile (e.g. article of clothing, blanket, sport pennant, etc.) with a rewritable display, wherein the user may alter the design on the canvas display. The system may further include a processor module, wherein the processor module is configured to alter the rewritable display design and/or clean the textile platform.

21 Claims, 5 Drawing Sheets

PROCESSING MODULE – DESIGN PRINTER

PROCESSING MODULE – WAND

SYSTEM AND METHOD FOR AN ON-DEMAND REWRITABLE, COLOR DISPLAY ON SOFT MATERIAL

CROSS-REFERENCE TO RELATED APPLICATIONS

This application claims the benefit of U.S. Provisional Application No. 63/000,614, filed on 27 Mar. 2020, which is incorporated in its entirety by this reference.

TECHNICAL FIELD

This invention relates generally to the field of rewritable coloring, and more specifically to a new and useful system and method for rewritable coloring on soft material.

BACKGROUND

Textiles and apparel products are mostly static color, resulting in the unnecessary need to overproduce products, creating unsustainable waste streams, and offering poor user experiences for consumers. Prior art such as (2003/0224155A1), (WO 2013/096356 A1), (U.S. Pat. No. 10,188,155B2), and (US 2011/0308113 A1) have attempted to solve these problems with color changing material systems but have resulted in products that only work for a short time duration, require complex electronics for display operation, and alter the properties of the textiles greatly thus limiting their everyday use as rewritable articles of textiles or apparel.

Thus, there is a need in the rewritable coloring field to create a new and useful system and method for rewritable coloring on soft material. This invention provides such a new and useful system and method.

DESCRIPTION OF THE EMBODIMENTS

The following description of the embodiments of the invention is not intended to limit the invention to these embodiments but rather to enable a person skilled in the art to make and use this invention.

1. Overview

Figure 1:
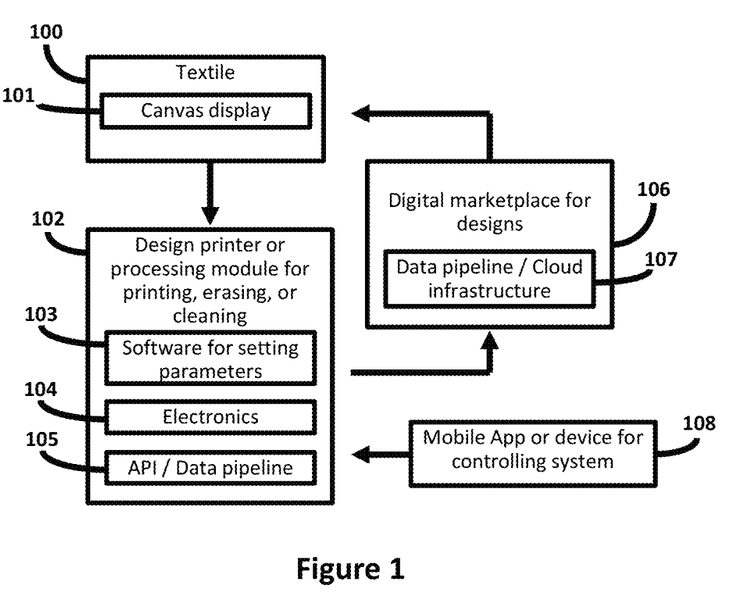
FIG. 1 is a flowchart representation of the system.
Figure 2:
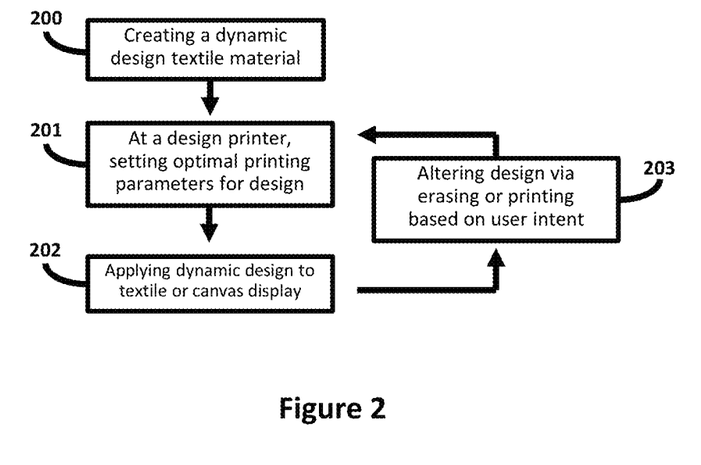
FIG. 2 is a flowchart representation of the method.
Figure 3:
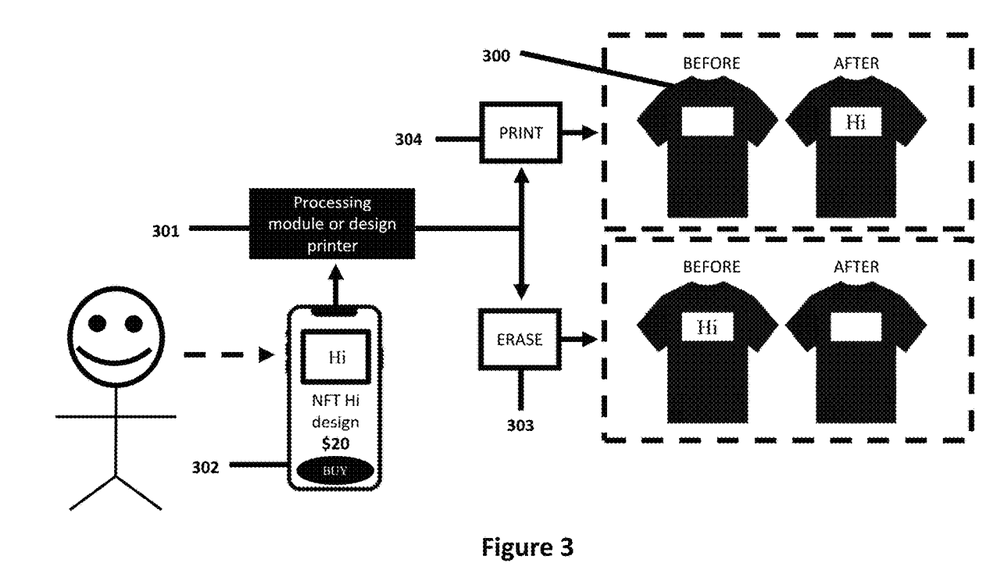
FIG. 3 is a schematic representation of the canvas display method.

As shown in FIG. 1 and FIG. 2, a system and method for a rewritable color display 101 on soft material functions as a textile material wo with a dynamic display, wherein the color and/or design of the display may be altered 203 on demand by appropriate stimulation (e.g., light, electricity, heat, etc.). The system and method may furthermore enable production 200 and operation of the rewritable color display on soft material. The system and method may comprise: any textile material (e.g., fabric, leather, silk, polyester, gore-tex, etc.) as a display scaffold; a canvas display, situated on the display scaffold comprising polymer, color changing substances; filler materials for increasing the performance of the display; and stabilizers, wherein the stabilizers protect the canvas display and extend the lifetime of the print. Furthermore, a processor module 102 may be used for altering the design of the canvas display 203 as well as for cleaning or sanitization of the canvas display and textile platform. The system and method may include creating the rewritable color display on soft material, comprising: obtaining the textile and color changing material, applying the canvas display, and treating the display. The canvas display thus can be utilized for on-demand rewritable apparel products that offer lower environmental footprints and increased customizability for users. For example, a T-Shirt with a rectangular canvas display 300 can be rewritten with a new design every day that is released by a content creator or designer by downloading the design via a smartphone app 302, syncing with the processor module or printer 301 shaped in the geometry of a conventional scanner to print 502, opening up the processor module's lid 500, aligning the T-Shirt 501 with the canvas display for printing, waiting for the processor module to print the design 304 onto the canvas display via light projection 503, and opening the lid to take the T-Shirt out to wear. If the user wants to erase the image the same process can be done but in reverse with another wavelength of light for erasing 305. Similarly, in another use-case, a shoe with the canvas display can be rewritten with a custom design with the processor module to customize the design based on new releases from their favorite artist or creator as dynamic merchandise. The same can be done with shoes, pants, leggings, dresses, handbags, among other products with textile platforms.

The system and method disclosed herein may enable a systems-level product experience that's rewritable, allows for on-demand writing and erasing of a multitude of designs in a digital manner, is washable, durable, and scalable with existing manufacturing processes used in the textile industry (e.g. screen-printing, etc.) resulting in a scalable product experience that has not yet existed in the market.

The system and method may provide a number of potential benefits. The system and method are not limited to always providing such benefits and are presented only as exemplary representations for how the system and method may be put to use. The list of benefits is not intended to be exhaustive and other benefits may additionally or alternatively exist.

One potential benefit is that the system and method may provide users or consumers a more personalized design. The system and method may enable users to have clothing with personally desired designs that may be updated on-demand.

Another potential benefit may include a reduced environmental impact as compared to the current consumption of clothing and textile products. With on-demand updated designs on clothing, users or customers may have less need for distinct articles of clothing (e.g. one t-shirt with and on-demand rewritable display may suffice instead of ten different t-shirts each with a different design, etc.).

Additionally, the system and method may also reduce the environmental impact of washing, drying, and cleaning of apparel by enabling an improved method for textile cleaning through UV, infrared light, and/or other forms of energy (e.g., electromagnetic, etc.).

Another benefit is that of using the rewritable canvas apparel to express one's views, fashion choices, artistic pieces, or for cultural expression.

Another benefit is to allow for the canvas apparel to be connected with an app and marketplace of digital designs, content, memes, including cryptocurrency mediated tokenized content in the form of NFTs (e.g., non-fungible tokens, etc.), to be able to be downloaded instantly and printed to be worn. Additional monetization opportunities for users can also be enabled wherein users can upload their own content, digital designs, memes, NFTs, or other media to buy or sell on a marketplace for additional income.

Another benefit to users is the ease of use to rewrite their canvas displays using an external processor module or printer. This enables easy printability or erase-ability of designs and can be done within seconds or minutes.

Another benefit to users is the ability to clean or sanitize their canvas display and apparel item in addition to the ability to rewrite dynamic designs. This decreases the need to use conventional washing or drying processes that utilize water, chemicals, and take time.

The system and method may be particularly suited to fashion oriented consumer because it allows for expression, personalization, and showcasing of unique content or designs.

The system and method may also be applicable for environmentally conscious consumers because it decreases the need for additional textiles or apparel items thereby decreasing the environmental footprint of the consumers.

The system and method may also be applicable for marketing purposes. The system and method may be used as an advertising tool wherein users can get paid to advertise content on their canvas textile or apparel. This can be operated via a smartphone app connected to a digital marketplace for designs or advertisements where users can earn incentives (e.g., income, discounts, goods, etc.) in return for printing advertisements or messages onto their canvas displays.

The system and method may also be applicable for in-person or virtual sporting events, concerts, and other large or small scale event gatherings where custom designs and content can be readily rewritten on the canvas to create new engagement experiences for users or new opportunities to create expression. For example, a sporting event can send out limited edition designs for canvas users to print onto their canvas display T-Shirts with their own canvas printers or at the sporting event site with canvas printers. For example, the design may be limited edition and can be downloaded easily via a smartphone to be printed on the canvas printer. The fans that receive said limited edition designs may have access to unique fan experiences or content. Similarly, at a music concert or festival a specific set of fans may be sent a limited edition digital design of the album art work for their favorite artist which they can print and wear to the concert for backstage access and other unique engagement experiences. This allows for a seamless and connected experience for the fans. In these scenarios, there is no need for managing the logistics of printing physical apparel or merchandise for fan engagement, decreasing environmental footprint, hassle, and cost. It can also allow for instant receipt of a diverse array of designs and content to be printed personalized to each fan. This can be mediated via the canvas digital marketplace and app.

The system and method may also be applicable for corporates, universities, printing centers, and the like where kiosks can be setup for users to print or erase their canvas apparel.

The system and method may also be applicable for industrial environments where uniforms are needed to denote personnel information.

The system and method may also be applicable for social media integration (e.g. Twitter, Facebook, Instagram, Snapchat, TikTok, Clubhouse, etc.), augmented/mixed reality, and the like for immediate conversion to content to be printed onto the canvas apparel, etc. For example, a user can use their smartphone to share a piece of content whether visual or text based from social media, send it to a native app, sync with the canvas printer or processing module for printing, and print to the canvas display. The content may also have a unique signature associated with it that allows the user to claim ownership rights to that content for printing onto the canvas display and also for selling on the canvas digital goods marketplace. The integration with social media or mixed/augmented reality applications may be done via an API (application programming interface), SDK (software development kit), or another data integration framework.

The system and method may also be applicable for mixed/augmented reality content, electronic gaming environments, or virtual realities (e.g., metaverse, etc.) wherein virtual goods and content in these alternative reality environments can be readily downloaded or uploaded to the canvas app, synced with the printer, and printed onto the canvas display to wear in the physical world. For example, users of an electronic game or virtual environment may have a need to wear a virtual T-shirt design they may have worn in the virtual environment. The user can easily download or upload the design, sync to their canvas printer or processing module, and print onto their canvas display.

2. System

As shown in FIG. 1, a system for a rewritable color display on soft material of a preferred embodiment can include: a textile platform 100; a canvas display 101, comprising color changing dyes, pigments, nano-fillers (e.g., metal-oxides, carbon materials, semiconductors, etc.), polymer materials (e.g., micro-capsules, multi-component polymers, etc.), and stabilizers. In some variations, the system may include other components for preventing parasitic degradation or other forms of degradation of the material system (e.g., due to electromagnetic energy, thermal energy, or other external stimuli). In some variations, these systems may be in the form of multi-layered films, additives, or ink coatings printed onto the textile. The system functions as a textile (e.g., article of clothing, blanket, sport pennant, etc.) with a rewritable display, wherein the user may alter the design on the canvas display. In some variations, the system may further include a processor module, wherein the processor module is configured to alter the rewritable display design. The processor module may also be known as a 'printer' that can utilize a range of electromagnetic signals to 'print' or 'project' the design onto the canvas display, thereby altering the physical and chemical properties of the material constituents of the canvas display exhibited by a change in color and design. Additionally, the processor module may enable cleaning of the textile platform (e.g., shirt, pants, dresses, shoes, etc.) to neutralize odors, dirt, oil, microbes, and other foreign materials that can accumulate on the textile by a similar process of utilizing a range of electromagnetic energies 102. The processor module may include electronics that include controlling units, light sources, housing, and embedded layout design of components for efficient thermal and photonic dissipation and/or management 104. The processor module may include software for setting the optimal parameters for printing or erasing 103. In another variation, the system may be a portable or standalone device. In another variation, the system may include an embedded display that acts as an electronic display with a user-interface for operating the system and embedded electronics for controlling, powering, and communicating with smart devices such as smartphones 108. The system may also include interfacing with data infrastructures 107 that allow for consumer-friendly uploading or downloading of designs via mobile device interfaces as well as monetization opportunities via an integrated digital goods marketplace 106. An API or SDK may also be utilized as a way of creating systems and sub-systems for creating data pipelines and data infrastructures for the efficient operation of the system 105.

The system may include a textile platform. The textile platform functions as the 'platform' for the rewritable display. The textile platform may comprise any type of textile material (natural or synthetic) and may vary dependent on implementation. For example, the textile platform may comprise: cotton, silk, nylon, wool, leather, polyester, rayon, gore-tex, polyurethane derivatives, co-polymers, or any virgin, recycled, or biodegradeable combination thereof etc. The textile platform may have any desired shape, which may be dependent on implementation. Examples include: shirt, pants, dresses, socks, shoes, blanket, baseball pennant, banners, tents, car upholstery, etc.

Figure 4:
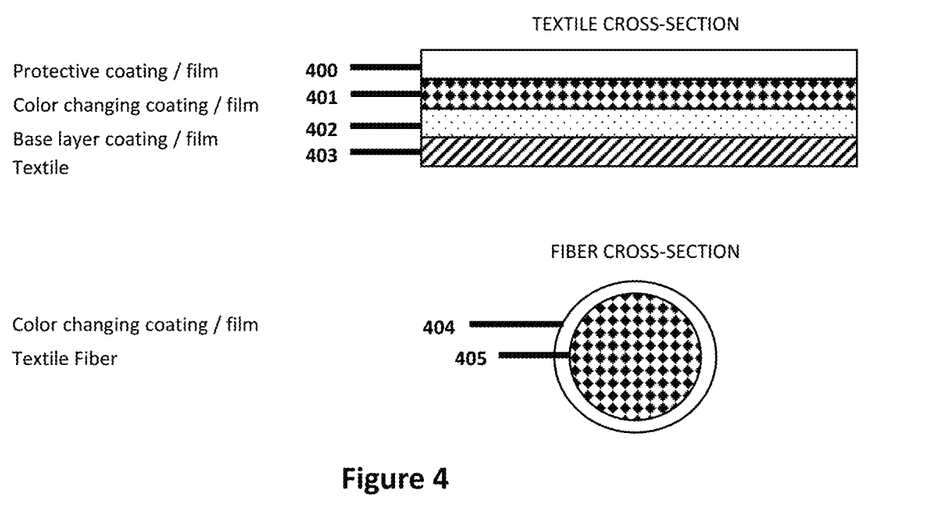
FIG. 4 is a schematic representation of the canvas display.

The system may include a canvas display. The canvas display functions as the dynamic design on the soft material. The canvas display can be in the form of a thin fiber-level color changing coating (nanometer-micrometers) 404 that is physically deposited to form a matrix with the fibers 405 or chemically functionalized onto the fiber's functional chemical groups, or a single or multi-layered coating (with 1-10 layers) that sits on top of the fiber structure or textile platform which include a textile 403, base layer 402, color changing layer 401, and a protective layer 400. The canvas display may also have protective coatings or films that increase durability and washability of the canvas display and textile 400. The canvas display may include non-electronic or electronic components to enable dynamic designs to be written or erased by external stimuli.

The canvas display may comprise a roughly two-dimensional coating on some region of the textile platform. The canvas display may have any desired shape, limited only by the size and shape of the textile platform. In one variation for a T-shirt textile platform, the canvas display comprises a square box on the front chest area of the T-shirt. In some variations, the system may include multiple canvas displays. As another example of the T-shirt variation, the canvas display may comprise a rectangle box on the front chest area and another rectangle box directly opposite on the back of the T-shirt. In another variation, the canvas display may comprise the entire surface area of the textile platform. For example, for a pair of pants textile platform, the canvas display may cover the entire outer region of the pants, thus enabling changing the color of the pants.

The canvas display preferably includes color changing substances. The color changing substances function to enable color or design changes of the canvas display. The color changing substances may comprise color changing dyes or pigments. In one variation, these color changing dyes are light sensitive, wherein ultraviolet (UV) light of a certain wavelength may be used to change the color of the canvas display. In another variation the color changing substances may be activated by a pH sensitive reactive agent which mediates a reversible chemical reaction leading to a shift in color. In another variation the color changing dyes may be temperature sensitive. In another variation, the color changing dyes may be electro-sensitive. The color changing substances may comprise color changing dyes or pigments that meet the desired properties as described herein. Examples of implemented color changing dyes include: leuco dyes (e.g., methylene blue, methyl orange, green, thiazine derivatives, etc), photochromic dyes (e.g., diarylethenes, spiroxazines, spiropyran, fulgide, naphthopyrans, azobenzene, dairylheterocycle ethylene, etc), and viologens among others.

In some variations, the color changing dyes may be photosensitive. Examples of photosensitive color changing dyes include: leuco dyes, photochromic dyes (diarylethenes, spiroxazines, spiropyran, fulgide, azobenzene, dairylheterocycle ethylene, etc.). Photosensitive dyes function by changing color with light. In one variation a wavelength of approximately 100 nm-1000 nm may change the color of the canvas display by allowing these selective wavelengths to induce color changing reactions in the color changing material.

The canvas display may also contain mixtures of various color changing substances or color changing dyes or pigments to achieve better resolution for printed designs. These mixtures may be 0.001-10 wt % and may be in ink or polymer film form.

The canvas display may also contain a polymer matrix to embed the color changing substances into. The polymers may include polyurethane, polyvinyl alcohol, polyvinyl acetate, polyvinyl chloride, polybutyl acrylate, polyisoprene, polyacrylamide, polymethyl methylacrylate, polyhydroxyethyl acrylate, hydroxyethyl cellulose, poly(N-vinylpyrrolidinone), silicones, cellulosic derivatives, chitosan, etc. In some variations, these polymers may be homo-polymers, co-polymers, di-block polymers, tri-block polymers, and the like.

In some variations the color changing material in its ink or fluid form may have a viscosity ranging from 5 cps to 100,000 cps. The color changing ink formulation can be a colloidal suspension where the particles are dispersed in a liquid solvent along with a polymer binder. The polymer binder may include polyurethane, polyvinyl alcohol, polyvinyl acetate, polyvinyl chloride, polybutyl acrylate, polyisoprene, polyacrylamide, polymethyl methylacrylate, polyhydroxyethyl acrylate, hydroxyethyl cellulose, poly(N-vinylpyrrolidinone), silicones, cellulosic derivatives, chitosan, etc. In some variations, these polymers may be homo-polymers, co-polymers, di-block polymers, tri-block polymers, and the like. Depending on the viscosity of the ink, the coating process can be done by screen printing, knife coating, spray coating, or drop-on-demand coating processes depending on the nature of the canvas display needed on the textile platform.

In some variations, these polymers or films may provide protection from electromagnetic wavelengths that may decrease the performance of the canvas display. This protection may be provided by filtering certain wavelengths of light based on optical properties such as angle of incidence, wavelength, and other relevant parameters.

In some variations, the color changing material may be a mixture or combination of color changing and non-color changing substances that may include: photosensitive, temperature sensitive, electro-sensitive, or static-colored substances. In such variations, various stimuli can be applied to reach target color palettes.

In some variations, conductive electrode structures may be integrated into the canvas display for delivering on-demand stimulus for inducing a change in color via an input voltage.

In some variations, the canvas display may further include an adhesive material. The adhesive material functions as bonding multiple layers of materials together to create single or multi-layered films. The adhesive material may be laminated with conventional textile manufacturing processes such as heat-lamination. The adhesive material may include heat-pressable polymer films, non-woven adhesive films or webs, or polymeric adhesives. Examples of the adhesive material are: polyurethane, silicone, bio-adhesives, etc.

The system may include stabilizers. Stabilizers function as chemical agents or fillers that prevent parasitic chemical reactions from occurring due to repeated print or erase cycles. In some variations these stabilizers can prevent or reduce degradation (e.g., photodegradation, oxidative degradation, thermal, etc.) over time, resulting in more durable devices. In another variation, these stabilizers may extend the lifetime of the print allowing the print to be visible for a longer period of time thus decreasing the fade rates of color changing substances. For example, stabilizers may allow a canvas display with photo-sensitive color changing substances to last longer in environments where there are ample wavelengths of light that may increase the fade rate of the dyes causing the print to fade back to its prior state. Examples of stabilizers include: hindered amine light stabilizers (HALS), light quenchers, UV absorbers, free radical scavengers or antioxidants, and the combinations thereof.

Figure 5:
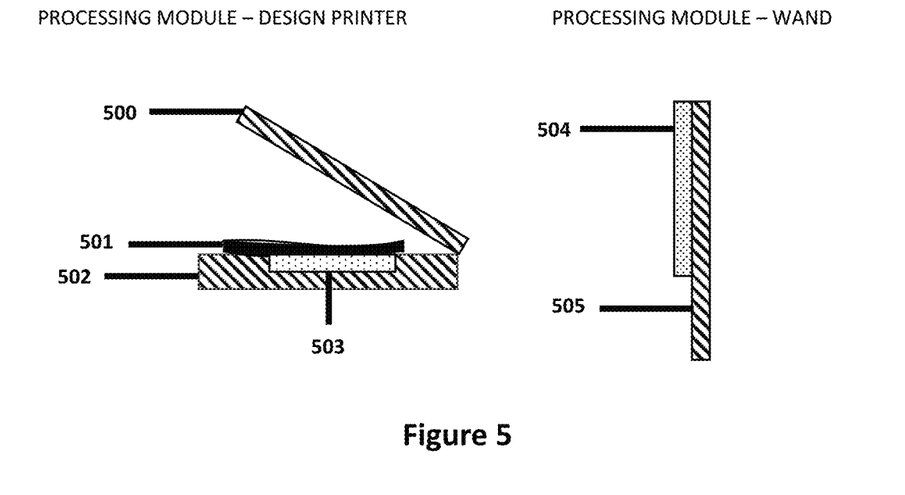
FIG. 5 is a schematic of the processing module or printer.

In some variations, the system may include a processor module. The processor module functions to alter the canvas display 501 to apply dynamic designs like a 'printer' or 'projector' or as an electronic element embedded inside the canvas display. In some variations, this processor module may be a standalone device similar to conventional inkjet printers, scanners, or video projectors embedded with an array of energy sources such as light emitting diodes 504, digital light projection devices, or rastering lasers. In another variation, this processor module may be in the form of a portable device that may function as a portable handheld device 505. Additionally, the processor module may function to clean and/or sanitize the textile platform using UV, infrared, or another wavelength of electromagnetic energy. The processor module may include specially designed optoelectronics that are designed for cleaning or sanitization of textile platforms.

Electronic components may include controlling units that connect to wireless networks (4G, 5G, wifi, satellite, etc.) for data receiving and/or transmission, rechargeable battery units for power, AC/DC input/output, controlling units for processing designs for printing or erasing, optoelectronics for printing or erasing designs, and cleaning the textile platform.

In some variations, creating a dynamic design enabled textile material may further include aligning the textile platform onto a mannequin of a size similar to the user's body.

3. Method

As shown in FIG. 2, a method for a dynamic textile of a preferred embodiment can include: creating a dynamic design enabled textile material 200; at a design printer, setting parameters for the dynamic design 201; and at the design printer, applying the dynamic design to the textile material 202. The method may function to produce a dynamic design enabled textile and enable the alteration of the dynamic design 203.

The method may include, creating a dynamic design enabled textile material. Creating a dynamic design enabled textile material functions to enable the modification of a design area on the textile material as desired. Creating a dynamic design enabled textile material may include: producing a color changing material, applying the color changing material onto the textile in the form of curable inks or films with embedded color changing substances; optionally applying layers of protective coatings or laminates in the form of inks or films.

Creating a dynamic design enabled textile material may include producing a color changing material. Producing a color changing material may comprise obtaining and combining color changing substances that are sensitive to light, heat, voltage, or other forms of energy. Such materials may be obtained from external sources or custom developed.

In one example, producing a color changing material may comprise obtaining light sensitive material. In this example, color changing substances that change color when exposed to certain bandwidths of ultraviolet light are procured. In another example, producing a color changing material comprises combining substances that are sensitive to heat and material that is sensitive to voltage. In this second example, material that changes color when exposed to heat is combined with material that changes color when exposed to an electric charge.

Applying the color changing material may comprise of utilizing screen-printing to print a paste-like ink with a polymer binder, color changing substances, nano-fillers, solvents, and other materials that may allow for manufacturability.

In some variations, digital printing processes for printing low viscosity inks such as ink-jet printing or spray-printing may be used to develop 'pixels' of varying color changing substances strategically printed to produce 'RGB' or Red, Green, and Blue 'pixels' to produce the canvas display. For example, a high-resolution canvas display may be produced with pixels printed which include RGB color changing substances (e.g., dyes, pigments, nanoparticles, etc.) that can be activated or de-activated by light or other stimuli to produce a dynamic print. Alternatively, these pixels may also be printed or embedded into either polymer films or multi-layered film structures. Additionally, these pixels may be printed as coatings chemically functionalized onto the textile fibers themselves.

In some variations, the color changing substances may be embedded into polymer films that may be laminated into multi-layered structures onto the textile platform for producing a canvas display.

Establishing layers may comprise establishing multi-layered structures that may include either inks or films with embedded color changing substances. Heat-lamination using heat-pressing techniques may be employed along with thermal, infrared, UV, or other curing or lamination methods for integrating the components to the textile platform.

The method may include setting parameters for the dynamic design. Setting parameters for the dynamic design may enable implementation of a desired design. Setting parameters for the dynamic design may occur at a design printer. Alternatively, setting parameters may occur on another device (e.g., at a smart phone for remote order and imprinting). Setting parameters for the dynamic design may include: selecting and/or creating a design, comprising downloading the design; converting the design into a printable file and adjusting for proper levels of energy for printing or erasing, and modifying the design. Furthermore, scanning the textile platform may also be employed by scanning devices to consider the topography, textile material properties, and other relevant properties of the textile product in a 3-dimensional printing scenario to help with setting of printing parameters.

For example, when a user downloads and syncs a design to print, the processor module will begin processing the design for computing the optimal setting parameters for printing the design. Scanning devices that are part of the printing process may scan the textile platform to set the optimal printing parameters even further allowing for the optimal print resolution and print quality. The computation of the print settings parameters may be done on-board the processor module or via a cloud based infrastructure on another set of devices.

The method may include potential software for computing the print time, print dimensions based on pixels, and other relevant parameters for performing a print or erase on the design. Additionally, there may exist an on board display for interfacing with the user for printing or erasing or a wireless connection method for interfacing with a user owned device such as a smartphone, tablet, or other device. Furthermore, this may include a mobile device app that serves as the user interface for performing printing or erasing functions, downloading or uploading designs, or for controlling other functions of the printer.

The processor module or printer may be setup in another embodiment that may include a boxed geometry or another enclosed geometry that may also include a mannequin the size of the user's body to allow for the textile apparel product to be fitted onto the mannequin to be then printed and cleaned in one continuous step. This 'black box' scenario will allow minimal steps on the user's part for printing a design of their choosing onto the canvas display and for cleaning their textile product.

The processor module or printer may be used to clean or sanitize the textile as well, with or without the help of additives in the canvas display itself or coated onto the fibers. For example, the additives for cleaning may already be present inside the canvas display or as a pre-existing coating on the textile itself. These additives may accelerate the neutralization of odors, microbes, dirt, oil, and other foreign particulates that accumulate onto textiles over time.

As a person skilled in the art will recognize from the previous detailed description and from the figures and claims, modifications and changes can be made to the embodiments of the invention without departing from the scope of this invention as defined in the following claims.

I claim:

1. A system for creating and operating on-demand dynamic textile platforms for rewritable designs via a canvas display embedded on the textile platform comprising:
   a canvas display made of a color changing material comprising polymers, color changing substances, nano-fillers, and stabilizers;
   a textile platform, wherein the canvas display is embedded on the textile platform;
   a processor module configured to alter designs on-demand on the canvas display, wherein the processor module is an external device that emits electromagnetic energy to alter the canvas display.

2. The system of claim 1, wherein the color changing material comprises of color changing substances of 0.001-10 wt %, polymer binders, and stabilizers for protection of the canvas display.

3. The system of claim 2, wherein the color changing material comprises photochromic material.

4. The system of claim 2, wherein the color changing material comprises thermochromic material.

5. The system of claim 2, wherein the color changing material comprises electrochromic material.

6. The system of claim 1, wherein the color changing material is applied via printing, lamination to produce 1-10 layers; including a series of base layers to coat the textile initially, to reduce surface roughness for adhering subsequent layers of material, a subsequent series of layers of varying color changing material(s), and a protective layer.

7. The system of claim 1, wherein the protective layer allow selective wavelengths of light or energy to be absorbed or reflected to provide optimum performance of the canvas display.

8. The system of claim 1, wherein the processor module is configured to clean the textile platform and the canvas display.

9. The system of claim 1, wherein the processor module is embedded inside the canvas display and emits electromagnetic energy to alter the canvas display.

10. The system of claim 1, comprising a second processor module, wherein the second processor module is configured to scan the topography of the textile platform to properly and set parameters for printing or erasing designs on the canvas display, comprising at least setting print resolution.

11. The system of claim 1, wherein the processor module is configured to alter designs on the canvas display.

12. A system for creating and operating on-demand dynamic textile platforms for rewritable designs via a canvas display embedded on the textile platform comprising:
   a canvas display made of a color changing material comprising polymers, color changing substances, nano-fillers, and stabilizers, wherein the color changing material comprises photochromic material;
   a textile platform, wherein the canvas display is embedded on the textile platform;
   a processor module configured to alter designs on-demand on the canvas display.

13. The system of claim 12, wherein the color changing material comprises of color changing substances of 0.001-10 wt %, polymer binders, and stabilizers for protection of the canvas display.

14. The system of claim 12, wherein the processor module is an external device that emits electromagnetic energy to alter the canvas display.

15. The system of claim 12, wherein the processor module is embedded inside the canvas display and emits electromagnetic energy to alter the canvas display.

16. The system of claim 12, wherein the processor module is configured to clean the textile platform and the canvas display.

17. A system for creating and operating on-demand dynamic textile platforms for rewritable designs via a canvas display embedded on the textile platform comprising:
   a canvas display made of a color changing material comprising polymers, color changing substances, nano-fillers, and stabilizers, wherein the color changing material comprises thermochromic material;
   a textile platform, wherein the canvas display is embedded on the textile platform;
   a processor module configured to alter designs on-demand on the canvas display.

18. The system of claim 17, wherein the color changing material comprises of color changing substances of 0.001-10 wt %, polymer binders, and stabilizers for protection of the canvas display.

19. The system of claim 17, wherein the processor module is an external device that emits electromagnetic energy to alter the canvas display.

20. The system of claim 17, wherein the processor module is embedded inside the canvas display and emits electromagnetic energy to alter the canvas display.

21. The system of claim 17, wherein the processor module is configured to clean the textile platform and the canvas display.

* * * * *